United States Patent
Cook et al.

(10) Patent No.: US 8,432,070 B2
(45) Date of Patent: Apr. 30, 2013

(54) PASSIVE RECEIVERS FOR WIRELESS POWER TRANSMISSION

(75) Inventors: Nigel P Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 12/546,613

(22) Filed: Aug. 24, 2009

(65) Prior Publication Data

US 2010/0190435 A1 Jul. 29, 2010

Related U.S. Application Data

(60) Provisional application No. 61/091,684, filed on Aug. 25, 2008, provisional application No. 61/117,937, filed on Nov. 25, 2008, provisional application No. 61/161,291, filed on Mar. 18, 2009, provisional application No. 61/161,306, filed on Mar. 18, 2009, provisional application No. 61/175,337, filed on May 4, 2009, provisional application No. 61/218,838, filed on Jun. 19, 2009.

(51) Int. Cl.
*H02J 7/00* (2006.01)
(52) U.S. Cl.
USPC .......................................................... 307/150
(58) Field of Classification Search .................... 307/150
See application file for complete search history.

(56) References Cited

U.S. PATENT DOCUMENTS

| | | | |
|---|---|---|---|
| 4,213,103 A | 7/1980 | Birt | |
| 5,239,459 A | 8/1993 | Hunt et al. | |
| 5,276,912 A | 1/1994 | Siwiak et al. | |
| 5,671,133 A | 9/1997 | Fujita et al. | |
| 5,675,232 A | 10/1997 | Koenck | |
| 5,905,360 A | 5/1999 | Ukita | |
| 5,955,865 A | 9/1999 | Koike et al. | |
| 6,169,389 B1 | 1/2001 | Chen | |
| 6,243,566 B1 | 6/2001 | Peckham et al. | |
| 6,275,143 B1 | 8/2001 | Stobbe | |
| 6,321,067 B1 | 11/2001 | Suga et al. | |
| 6,373,790 B1 | 4/2002 | Fujisawa | |

(Continued)

FOREIGN PATENT DOCUMENTS

| | | | |
|---|---|---|---|
| CN | 1256559 A | 6/2000 | |
| DE | 1019714 B | 11/1957 | |

(Continued)

OTHER PUBLICATIONS

Birca-Galateanu, S., "Low peak current Class E resonant full-wave low dv/dt rectifier driven by a square wave voltage generator", Power Electronics Specialists Conference 1999 (PESC '99), 30th Annual IEEE, Publication Date: Aug. 1999, pp. 469-474, vol. 1.

(Continued)

*Primary Examiner* — Robert L. Deberadinis
(74) *Attorney, Agent, or Firm* — Knobbe, Martens, Olson & Bear, LLP

(57) ABSTRACT

Exemplary embodiments are directed to wireless power transfer. A wireless power transmission receiver includes a receive antenna including a parallel resonator configured to resonate in response to a magnetic near-field and couple wireless power therefrom. The receiver further includes a passive rectifier circuit coupled to the parallel resonator. The passive rectifier circuit is configured to transform a load impedance to the parallel resonator.

46 Claims, 10 Drawing Sheets

U.S. PATENT DOCUMENTS

| | | | |
|---|---|---|---|
| 6,380,801 B1 | 4/2002 | McCartney | |
| 6,400,274 B1 | 6/2002 | Duan et al. | |
| 6,515,878 B1 | 2/2003 | Meins et al. | |
| 6,646,415 B1 | 11/2003 | Nebrigic et al. | |
| 6,724,263 B2 | 4/2004 | Sugiura | |
| 6,907,231 B2 | 6/2005 | Bhatti | |
| 7,071,792 B2 | 7/2006 | Meck | |
| 7,088,971 B2 | 8/2006 | Burgener et al. | |
| 7,307,475 B2 | 12/2007 | Coleman | |
| 7,372,775 B2 | 5/2008 | Hayashi | |
| 7,518,267 B2 | 4/2009 | Baarman | |
| 7,535,362 B2 | 5/2009 | Moser et al. | |
| 7,612,527 B2 | 11/2009 | Hoffman et al. | |
| 7,741,734 B2 | 6/2010 | Joannopoulos et al. | |
| 7,747,228 B2 | 6/2010 | Kasha et al. | |
| 7,825,543 B2 | 11/2010 | Karalis et al. | |
| 7,917,104 B2 | 3/2011 | Manssen et al. | |
| 2001/0030581 A1 | 10/2001 | Dent | |
| 2002/0096568 A1 | 7/2002 | Arisawa | |
| 2002/0140403 A1 | 10/2002 | Reddy | |
| 2005/0029351 A1 | 2/2005 | Yoshinaga et al. | |
| 2005/0134213 A1 | 6/2005 | Takagi et al. | |
| 2006/0187049 A1 | 8/2006 | Moser et al. | |
| 2006/0290475 A1 | 12/2006 | Murdoch et al. | |
| 2007/0008140 A1 | 1/2007 | Saarisalo et al. | |
| 2007/0010217 A1 | 1/2007 | Takahashi et al. | |
| 2007/0252441 A1 | 11/2007 | Yamauchi et al. | |
| 2008/0088417 A1 | 4/2008 | Smith et al. | |
| 2008/0122401 A1 | 5/2008 | Sato et al. | |
| 2008/0224655 A1 | 9/2008 | Tilley et al. | |
| 2010/0109443 A1 | 5/2010 | Cook et al. | |
| 2010/0148723 A1 | 6/2010 | Cook et al. | |
| 2010/0184371 A1 | 7/2010 | Cook et al. | |
| 2012/0262004 A1 | 10/2012 | Cook et al. | |

FOREIGN PATENT DOCUMENTS

| | | | |
|---|---|---|---|
| EP | 0533247 A1 | 3/1993 | |
| EP | 1494162 A2 | 1/2005 | |
| JP | 3239003 A | 10/1991 | |
| JP | 07170132 | 7/1995 | |
| JP | 7231585 A | 8/1995 | |
| JP | 10145987 A | 5/1998 | |
| JP | 10256957 | 9/1998 | |
| JP | 2000165132 A | 6/2000 | |
| JP | 2003299255 A | 10/2003 | |
| JP | 2004194400 A | 7/2004 | |
| JP | 2004206245 A | 7/2004 | |
| JP | 2004206383 A | 7/2004 | |
| JP | 2005026741 A | 1/2005 | |
| JP | 2005536927 A | 12/2005 | |
| JP | 2010507142 A | 3/2010 | |
| KR | 20070039127 A | 4/2007 | |
| WO | WO9810836 | 3/1998 | |
| WO | WO03105311 A1 | 12/2003 | |
| WO | WO2004070941 | 8/2004 | |
| WO | WO2006006142 A1 | 1/2006 | |
| WO | 2006022365 A1 | 3/2006 | |
| WO | WO2007034421 A2 | 3/2007 | |
| WO | WO2009070730 A2 | 6/2009 | |
| WO | WO2010062198 A1 | 6/2010 | |

OTHER PUBLICATIONS

Fernandez C, et al., "Overview of Different Alternatives for the Contact-Less Transmission of Energy" IECON—2002. Proceedings of the 28th. Annual Conference of the IEEE Industrial Electronics Society. Sevilla, Spain, Nov. 5-8, 2002; [Annual Conference of the IEEE Industrial Electronics Society, IEEE, New York, NY, US LNKDDOI: 10.1109/IECON.2002.11, vol. 2, Nov. 8, 2002, pp. 1319-1323, XP001516268.

"Hyperfast Rectifier" International Rectifier , Dec. 31, 2006, XP002576261 Retrieved from the Internet: URL:http://www.irf.com/product-info/datasheets/data/30cth02.pdf>.

International Search Report—PCT/US2009/054960, International Search Authority—European Patent Office—Nov. 25, 2009.

Kobayashi H, et al., "Current Mode Class-D Power Amplifiers for High Efficiency RF Applications" 2001 IEEE MTT-S International Microwave Symposium Digest.(IMS 2001). Phoenix, AZ, May 20-25, 2001; [IEEE MTT-S •International Microwave Symposium], New York, NY: IEEE, US LNKDDOI: 10.1109/MWSYM.2001.967047, May 20, 2001, pp. 939-942, XP001067408.

"MR750 Series, High Current Lead Mounted Rectifiers" on Semiconductor, Oct. 31, 2000, XP002576260 Retrieved from the Internet: URL:http://www.rose-hulman.edu/{herniter/Data_Sheets/MR750-D.pdf>.

"Surface Mount Schottky Power Rectifier MBRS2040LT3" Motorola Semiconductor, Dec, 31, 1996, XP002576262 Retrieved from the Internet: URL:http://www.datasheetcatalog.net/de/datasheets_pdf/M/B/R/S/MBRS2040LT3.shtml>.

Written Opinion—PCT/US2009/054960—ISA/EPO—Nov. 25, 2009.

Low et al., "Design and Test of a High-Power High-Efficiency Loosely Coupled Planar Wireless Power Transfer System," IEEE Transactions on Industrial Electronics, Vol. 56, No. 5, May 2009, pp. 1801-1812.

PASSIVE RECEIVERS FOR WIRELESS POWER TRANSMISSION

CLAIM OF PRIORITY UNDER 35 U.S.C. §119

This application claims priority under 35 U.S.C. §119(e) to:

U.S. Provisional Patent Application 61/091,684 entitled "PASSIVE DIODE RECTIFIER RECEIVERS FOR WIRELESS POWERING AND CHARGING OF ELECTRONIC DEVICES" filed on Aug. 25, 2008, the disclosure of which is hereby incorporated by reference in its entirety.

U.S. Provisional Patent Application 61/117,937 entitled "PASSIVE DIODE RECTIFIER RECEIVERS FOR WIRELESS POWERING AND CHARGING OF ELECTRONIC DEVICES" filed on Nov. 25, 2008, the disclosure of which is hereby incorporated by reference in its entirety.

U.S. Provisional Patent Application 61/161,291 entitled "PASSIVE DIODE RECTIFIER RECEIVERS FOR WIRELESS POWERING AND CHARGING OF ELECTRONIC DEVICES" filed on Mar. 18, 2009, the disclosure of which is hereby incorporated by reference in its entirety.

U.S. Provisional Patent Application 61/161,306 entitled "INTEGRATION OF WIRELESS CHARGING INTO MINI-DEVICES" filed on Mar. 18, 2009, the disclosure of which is hereby incorporated by reference in its entirety.

U.S. Provisional Patent Application 61/175,337 entitled "PASSIVE DIODE RECTIFIER RECEIVERS FOR WIRELESS POWERING WITH INHERENT LOAD ADAPTATION" filed on May 4, 2009, the disclosure of which is hereby incorporated by reference in its entirety.

U.S. Provisional Patent Application 61/218,838 entitled "DEVELOPMENT OF HF POWER CONVERSION ELECTRONICS" filed on Jun. 19, 2009, the disclosure of which is hereby incorporated by reference in its entirety.

BACKGROUND

1. Field

The present invention relates generally to wireless charging, and more specifically to devices, systems, and methods related to portable wireless charging systems.

2. Background

Typically, each powered device such as a wireless electronic device requires its own wired charger and power source, which is usually an alternating current (AC) power outlet. Such a wired configuration becomes unwieldy when many devices need charging. Approaches are being developed that use over-the-air or wireless power transmission between a transmitter and a receiver coupled to the electronic device to be charged. The receive antenna collects the radiated power and rectifies it into usable power for powering the device or charging the battery of the device. Wireless energy transmission may be based on coupling between a transmit antenna, a receive antenna and a rectifying circuit embedded in the host electronic device to be powered or charged. Shortcomings arise when load resistance as seen by the wireless power receiver circuit in the host electronic device is small due to, for example, battery technologies or geometries that exhibit a low charging resistance. Such low charging resistances reduce the charging efficiency. Accordingly, there is a need to improve the charging efficiency for wireless power transfer to electronic devices that exhibit a low charging resistance.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors. Power conversion in a system is described herein to wirelessly charge devices including, for example, mobile phones, cordless phones, iPod, MP3 players, headsets, etc. Generally, one underlying principle of wireless energy transfer includes magnetic coupled resonance (i.e., resonant induction) using frequencies, for example, below 30 MHz. However, various frequencies may be employed including frequencies where license-exempt operation at relatively high radiation levels is permitted, for example, at either below 135 kHz (LF) or at 13.56 MHz (HF). At these frequencies normally used by Radio Frequency Identification (RFID) systems, systems must comply with interference and safety standards such as EN 300330 in Europe or FCC Part 15 norm in the United States. By way of illustration and not limitation, the abbreviations LF and HF are used herein where "LF" refers to $f_0=135$ kHz and "HF" to refers to $f_0=13.56$ MHz.

Figure 1:
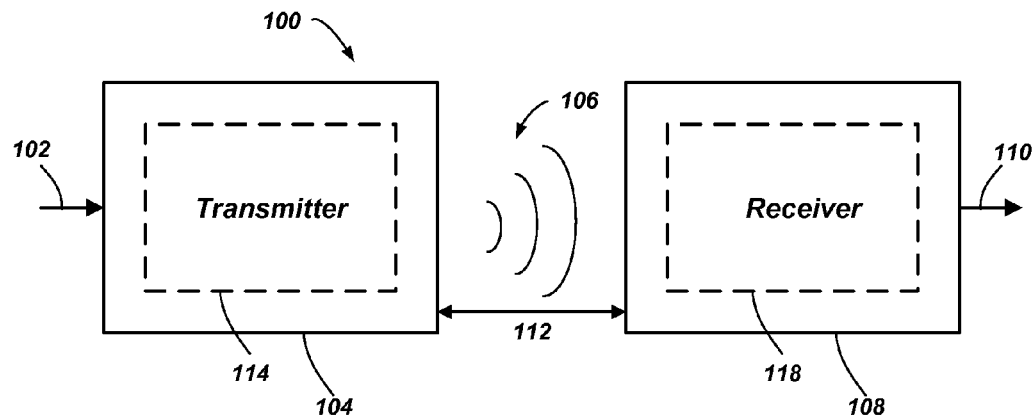
FIG. 1 illustrates a simplified block diagram of a wireless power transmission system.

FIG. 1 illustrates wireless power transmission system 100, in accordance with various exemplary embodiments. Input power 102 is provided to a transmitter 104 for generating a magnetic field 106 for providing energy transfer. A receiver 108 couples to the magnetic field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are matched, transmission losses between the transmitter 104 and the receiver 108 are minimal when the receiver 108 is located in the "near-field" of the magnetic field 106.

Transmitter 104 further includes a transmit antenna 114 for providing a means for energy transmission and receiver 108 further includes a receive antenna 118 for providing a means for energy reception or coupling. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. In this near-field, a coupling may be established between the transmit antenna 114 and the receive antenna 118. The area around the antennas 114 and 118 where this near-field coupling may occur is referred to herein as a coupling-mode region.

Figure 2:
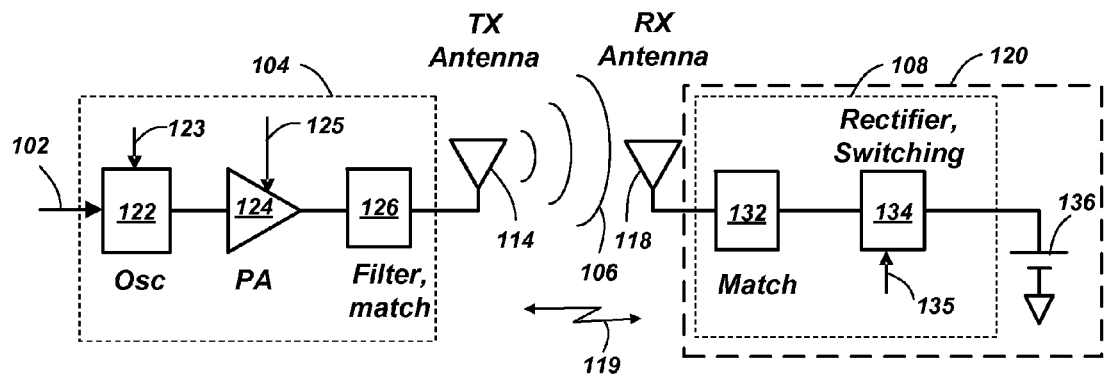
FIG. 2 illustrates a simplified schematic diagram of a wireless power transmission system.

FIG. 2 shows a simplified schematic diagram of a wireless power transmission system. The transmitter 104, driven by input power 102, includes an oscillator 122, a power amplifier or power stage 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

An electronic device 120 includes the receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
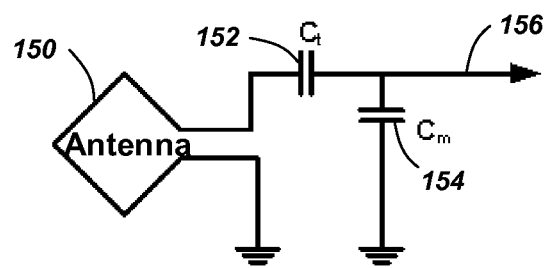
FIG. 3 illustrates a schematic diagram of a loop antenna, in accordance with exemplary embodiments.

As illustrated in FIG. 3, antennas used in exemplary embodiments may be configured as a "loop" antenna 150, which may also be referred to herein as a "magnetic," "resonant" or a "magnetic resonant" antenna. Loop antennas may be configured to include an air core or a physical core such as a ferrite core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more effective.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates a sinusoidal or quasi-sinusoidal signal 156. Accordingly, for larger diameter loop antennas, the size of capacitance needed to induce resonance decreases as the diameter or inductance of the loop increases. Furthermore, as the diameter of the loop antenna increases, the efficient energy transfer area of the near-field increases for "vicinity" coupled devices. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, antennas such as single and multi-turn loop antennas are used for both transmit (Tx) and receive (Rx) antenna systems since most of the environment possibly surrounding the antennas is dielectric and thus has less influence on a magnetic field compared to an electric field. Furthermore, antennas dominantly configured as "electric" antennas (e.g., dipoles and monopoles) or a combination of magnetic and electric antennas is also contemplated.

The Tx antenna can be operated at a frequency that is low enough and with an antenna size that is large enough to achieve good coupling efficiency (e.g., >10%) to a small Rx antenna at significantly larger distances than allowed by far-field and inductive approaches mentioned earlier. If the Tx antenna is sized correctly, high coupling efficiencies (e.g., 30%) can be achieved when the Rx antenna on a host device is placed within a coupling-mode region (i.e., in the near-field or a strongly coupled regime) of the driven Tx loop antenna The various exemplary embodiments disclosed herein identify different coupling variants which are based on different power conversion approaches, and the transmission range including device positioning flexibility (e.g., close "proximity" coupling for charging pad solutions at virtually zero distance or "vicinity" coupling for short range wireless power solutions). Close proximity coupling applications (i.e., strongly coupled regime, coupling factor typically k>0.1) provide energy transfer over short or very short distances typically in the order of millimeters or centimeters depending on the size of the antennas. Vicinity coupling applications (i.e., loosely coupled regime, coupling factor typically k<0.1) provide energy transfer at relatively low efficiency over distances typically in the range from 10 cm to 2 m depending on the size of the antennas.

As described herein, "proximity" coupling and "vicinity" coupling may require different matching approaches to adapt power source/sink to the antenna/coupling network. Moreover, the various exemplary embodiments provide system parameters, design targets, implementation variants, and specifications for both LF and HF applications and for the transmitter and receiver. Some of these parameters and specifications may vary, as required for example, to better match with a specific power conversion approach. System design parameters may include various priorities and tradeoffs. Specifically, transmitter and receiver subsystem considerations may include high transmission efficiency, low complexity of circuitry resulting in a low-cost implementation.

Figure 4:
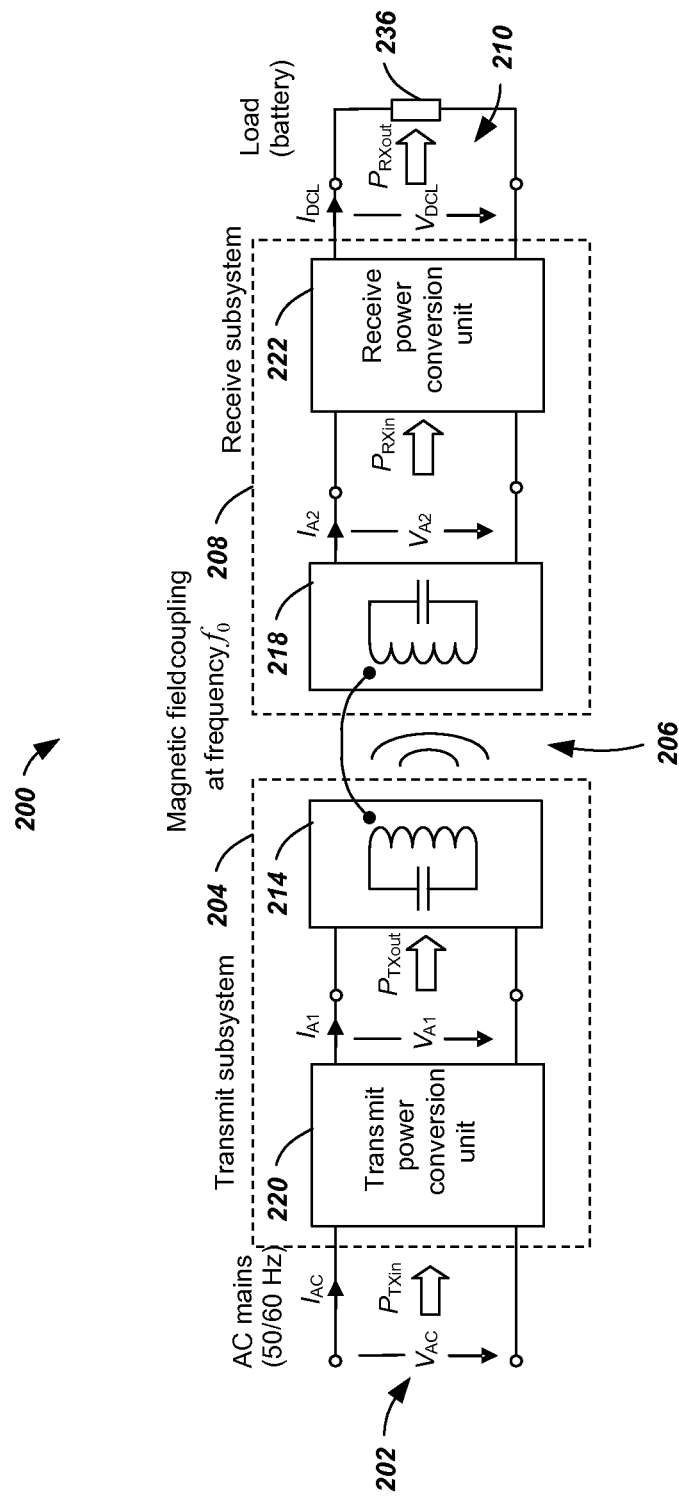
FIG. 4 illustrates a functional block diagram of a wireless power transmission system, in accordance with an exemplary embodiment.

FIG. 4 illustrates a functional block diagram of a wireless power transmission system configured for direct field coupling between a transmitter and a receiver, in accordance with an exemplary embodiment. Wireless power transmission system 200 includes a transmitter 204 and a receiver 208. Input power $P_{TXin}$ is provided to transmitter 204 for generating a predominantly non-radiative field with direct field coupling k 206 for providing energy transfer. Receiver 208 directly couples to the non-radiative field 206 and generates an output power $P_{RXout}$ for storing or consumption by a battery or load 236 coupled to the output port 210. Both the transmitter 204 and the receiver 208 are separated by a distance. In one exemplary embodiment, transmitter 204 and receiver 208 are configured according to a mutual resonant relationship and when the resonant frequency, $f_0$, of receiver 208 and the resonant frequency of transmitter 204 are matched, transmission losses between the transmitter 204 and the receiver 208 are minimal while the receiver 208 is located in the "near-field" of the radiated field generated by transmitter 204.

Transmitter 204 further includes a transmit antenna 214 for providing a means for energy transmission and receiver 208 further includes a receive antenna 218 for providing a means for energy reception. Transmitter 204 further includes a transmit power conversion unit 220 at least partially function as an AC-to-AC converter. Receiver 208 further includes a receive power conversion unit 222 at least partially functioning as an AC-to-DC converter.

Various receive antenna configurations are described herein which use capacitively loaded wire loops or multi-turn coils forming a resonant structure that is capable to efficiently couple energy from transmit antenna 214 to the receive antenna 218 via the magnetic field if both the transmit antenna 214 and receive antenna 218 are tuned to a common resonance frequency. Accordingly, highly efficient wireless charging of electronic devices (e.g. mobile phones) in a strongly coupled regime is described where transmit antenna 214 and receive antenna 218 are in close proximity resulting in coupling factors typically above 30%. Accordingly, various receiver concepts comprised of a wire loop/coil antenna and a well matched passive diode rectifier circuit are described herein.

Many Li-Ion battery-powered electronic devices (e.g. mobile phones) operate from 3.7 V and are charged at currents up to 1 A (e.g. mobile phones). At maximum charging current, the battery may therefore present a load resistance to the receiver on the order of 4 Ohms. This generally renders matching to a strongly coupled resonant induction system quite difficult since higher load resistances are typically required to achieve maximum efficiency in these conditions.

An optimum load resistance is a function of the secondary's L-C ratio (ratio of antenna inductance to capacitance). It can be shown however that there generally exist limits in the choice of the L-C ratio depending on frequency, desired antenna form-factor and Q-factor. Thus, it may not always be possible to design a resonant receive antenna that is well matched to the load resistance as presented by the device's battery.

Active or passive transformation networks, such as receive power conversion unit 222, may be used for load impedance conditioning, however, active transformation networks may either consume power or add losses and complexity to the wireless power receiver and therefore are considered inadequate solutions. In various exemplary embodiments described herein, receive power conversion unit 222 includes diode rectifier circuits that exhibit input impedance at a fundamental frequency that is larger than the load impedance $R_L$ of load 236. Such rectifier circuits, in combination with a low L-C resonant receive antenna 218, may provide a desirable (i.e., near optimum) solution.

Generally, at higher operating frequencies, for example above 1 MHz and particularly at 13.56 MHz, loss effects resulting from diode recovery time (i.e., diode capacitance) become noticeable. Therefore, circuits, including diodes exhibiting diode voltage waveforms with low dv/dt, are desirable. By way of example, these circuits typically require a shunt capacitor at the input which may function as an anti-reactor needed to compensate antenna inductance thus maximizing transfer efficiency. Therefore, receiver topologies that include a parallel resonant receive antenna are suitable.

The fact that required shunt capacitance maximizing transfer efficiency is a function of both coupling factor and battery load resistance and would required automatic adaptation (re-tuning) if one of these parameters was changed. Assuming a strongly coupled regime with changes of coupling factor within a limited range and maximum efficiency only at highest power, a reasonable compromise may however be found not requiring automatic tuning.

Another design factor for wireless power transmission based on magnetic induction principles is that harmonics are generated by a rectifier circuit. Harmonic content in the receive antenna current and thus in the magnetic field surrounding the receive antenna may exceed tolerable levels. Therefore, receiver/rectifier circuits desirably produce minimum distortion on the induced receive antenna currents.

FIGS. 5-14 Illustrate various receiver configurations including various circuit realizations including various diode and receive antenna configurations for providing an impedance to the receive antenna that is greater than the intrinsic charging impedance $R_L$ of the load 336. For the described receiver configurations, a series-configured transmit antenna 314, including inductive loop $L_1$ 302 and capacitor $C_1$ 304, with additional harmonics filtering is assumed so that the transmit antenna current is essentially sinusoidal. By way of example, assume a coupling factor>50%, an unloaded Q factor of 80 and 60 for transmit antenna 314 and receive antenna 318, respectively, these circuits may provide transfer efficiencies (transmit antenna input to receiver output) close to 90% at 13.56 MHz.

Figure 5:
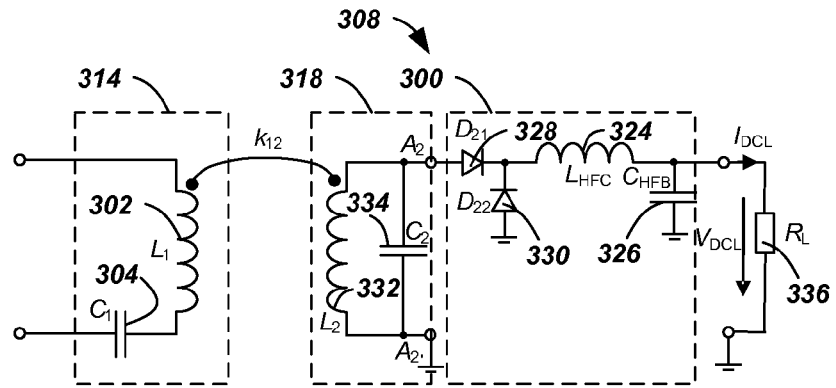
FIG. 5 illustrates a circuit diagram of a rectifier circuit variant of a wireless power receiver, in accordance with an exemplary embodiment.

FIG. 5 illustrates a circuit diagram of variant A of a wireless power receiver 308 including a resonant receive antenna 318, including inductive loop $L_2$ 332 and capacitor $C_2$ 334, based on a passive double diode half wave rectifier circuit 300, in accordance with an exemplary embodiment. Rectifier circuit 300 includes diode $D_{21}$ 328 and diode $D_{22}$ 330. Rectifier circuit 300 further includes a high frequency (HF) choke $L_{HFC}$ 324 and a high frequency (HF) block capacitor $C_{HFB}$ 326. The DC path is closed via the antenna loop. HF choke 324 acts as current sink and with a diode conduction cycle D of 50%, the transformation factor M is 0.5. Furthermore, the input impedance as seen at terminals $A_2, A_2'$ at a fundamental frequency is approximately 4 times the load resistance $R_L$.

Figure 6:
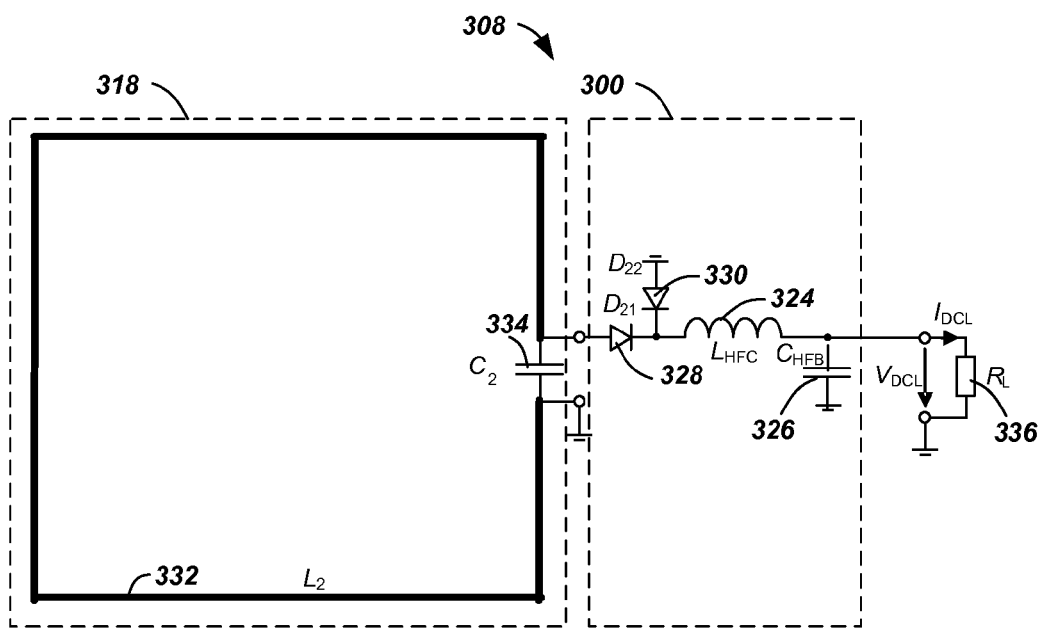
FIG. 6 illustrates a layout realization of the antenna part of the receiver variant of FIG. 5, in accordance with an exemplary embodiment.

FIG. 6 illustrates a low L/C realization of variant A of receiver 308 configured, for example, for a 13.56 MHz exemplary embodiment using a single turn loop receive antenna 318. According to the realization of variant A of receiver 308, receive antenna 318 requires only a single point connection to rectifier circuit 300. Furthermore, inductive loop $L_2$ 332 of resonant receive antenna 318 may be implemented using a single turn loop receive antenna 318 in view of the low charging impedance $R_L$ of the load 336.

Figure 7:
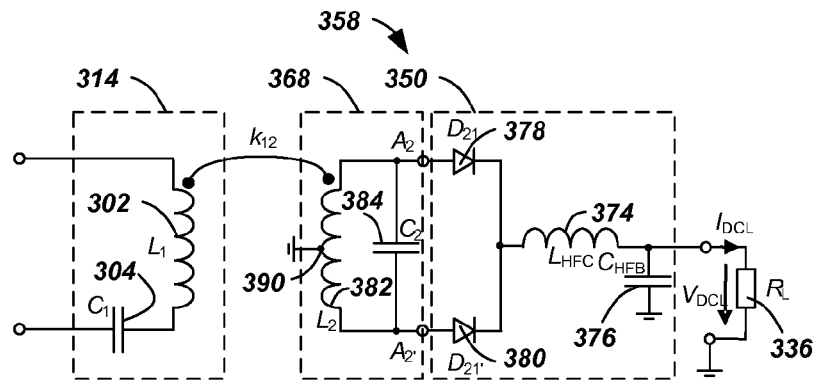
FIG. 7 illustrates a circuit diagram of another rectifier circuit variant of a wireless power receiver, in accordance with an exemplary embodiment.

FIG. 7 illustrates a circuit diagram of variant B of a wireless power receiver 358 including a resonant receive antenna 368, including inductive loop $L_2$ 382 and capacitor $C_2$ 384, based on a passive double diode half wave rectifier circuit 350, in accordance with an exemplary embodiment. Rectifier circuit 350 is implemented as a symmetric version of rectifier circuit 300 of FIG. 5 and FIG. 6. Rectifier circuit 350 includes diode $D_{21}$ 378 and diode $D_{21'}$ 380. Rectifier circuit 350 further includes a high frequency (HF) choke $L_{HFC}$ 374 and a high frequency (HF) block capacitor $C_{HFB}$ 376. HF choke 374 acts as current sink and is optimally dimensioned trading-off HF and DC losses. With a diode conduction cycle D of 50%, the output-to-input voltage transformation factor M of the rectifier is 0.5. Furthermore, the input impedance as seen at terminals $A_2, A_2'$ at a fundamental frequency is approximately 4 times the load resistance $R_L$.

Rectifier circuit 350 is implemented by DC tapping of the inductive loop $L_2$ 382 at point 390 to close the DC loop through diode $D_{21}$ 378 and diode $D_{22}$ 380. This tap at point 390 may be grounded as shown in FIG. 7. For symmetry reasons, the inductive loop $L_2$ 382 symmetry point 390 may be chosen for DC tapping. Alternatively, this DC tapping may also be performed at any point along the inductive loop $L_2$ 382 using an HF choke 392 (FIG. 8).

Figure 8:
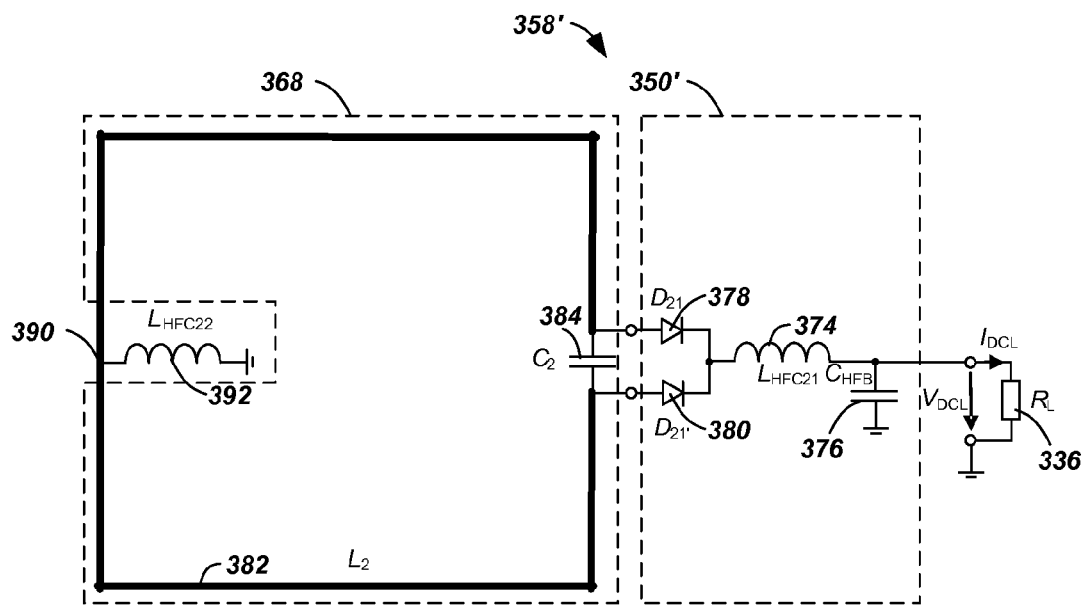
FIG. 8 a layout realization of the antenna part of the receiver variant of FIG. 7, in accordance with an exemplary embodiment.

FIG. 8 illustrates a low L/C realization of variant B of receiver 358 configured, for example, for a 13.56 MHz exemplary embodiment using a single turn loop receive antenna 368. According to the FIG. 8 realization of variant B of receiver 358, inductive loop $L_2$ 382 of receive antenna 368 may be implemented using a single turn loop receive antenna 368 in view of the low charging impedance $R_L$ of the load 336. As stated above with regard to FIG. 7, rectifier circuit 350 may be implemented by DC tapping of the inductive loop $L_2$ 382 at point 390. However, if an HF choke ($L_{HFC22}$) 392 is connected at a symmetry point 390 of the inductive loop $L_2$ 382, then minimum Q-factor degradation or detuning from a non-ideal HF choke ($L_{HFC22}$) 392 even in presence of an asymmetric mode is expected. Furthermore, since both HF chokes 374 and 392, carry the same DC current, it may be possible to move the load 336 into the DC ground connection of inductive loop $L_2$ 382 and to connect diodes directly to ground.

Figure 9:
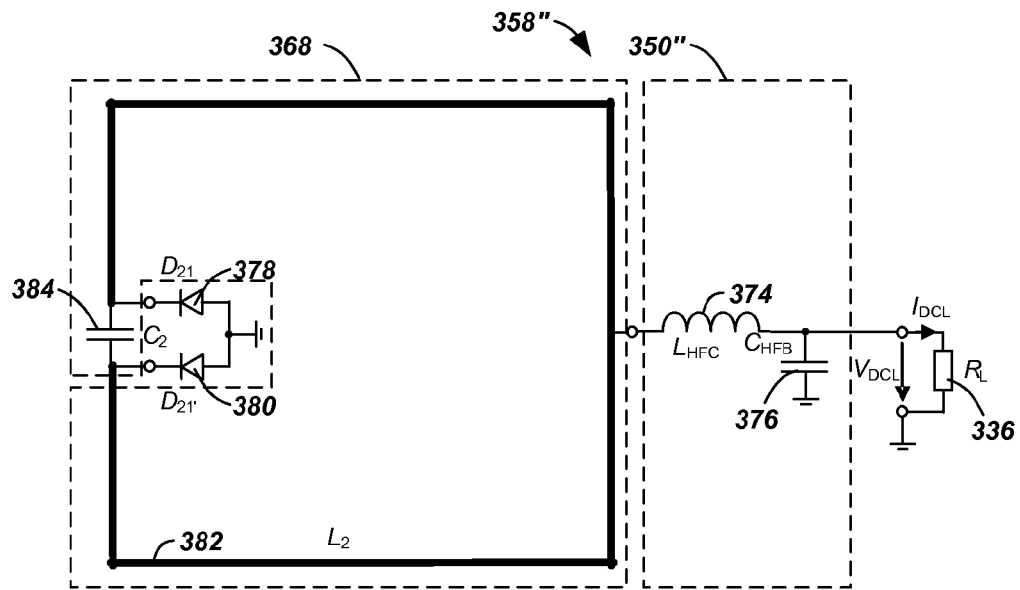
FIG. 9 another layout realization of the antenna part of the receiver variant of FIG. 7, in accordance with an exemplary embodiment.

FIG. 9 illustrates another low L/C realization of variant B of receiver 358 configured, for example, for a 13.56 MHz exemplary embodiment using a single turn loop receive antenna 368. According to the FIG. 9 realization of variant B of receiver 358, inductive loop $L_2$ 382 of receive antenna 368 may be implemented using a single turn loop receive antenna 368 in view of the low charging impedance $R_L$, of the load 336. The realization variant of FIG. 9 is implemented using a single HF choke 374 and directly grounded diodes 378 and 380.

Figure 10:
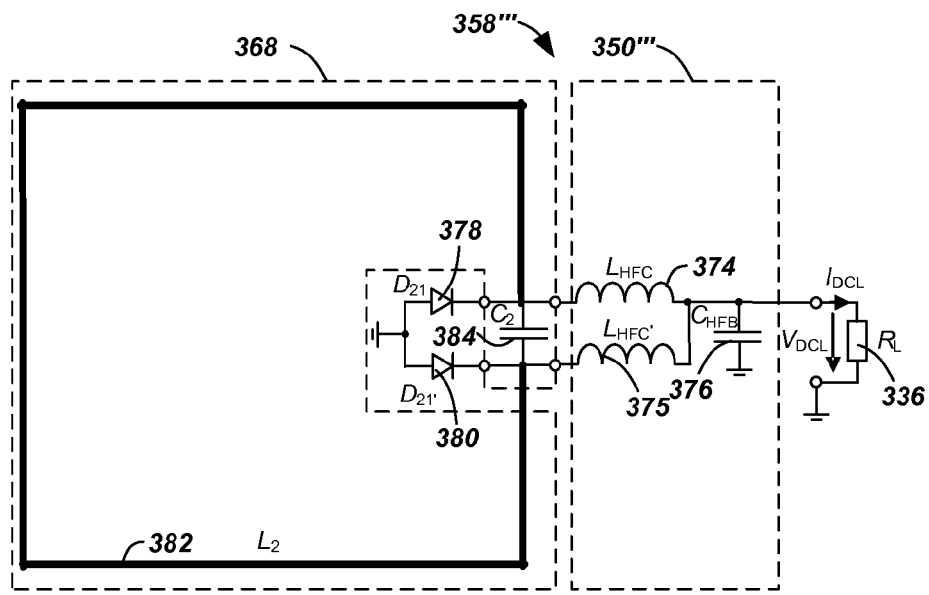
FIG. 10 yet another layout realization of the antenna part of the receiver variant of FIG. 7, in accordance with an exemplary embodiment.

FIG. 10 illustrates another low L/C realization of variant B of receiver 358 configured, for example, for a 13.56 MHz exemplary embodiment using a single turn loop receive antenna 368. According to the FIG. 10 realization of variant B of receiver 358, inductive loop $L_2$ 382 of receive antenna 368 may be implemented using a single turn loop receive antenna 368 in view of the low charging impedance $R_L$ of the load 336. The realization variant of FIG. 10 is implemented using a symmetrical pair of HF chokes 374 and 375 and directly grounded diodes 378 and 380.

Figure 11:
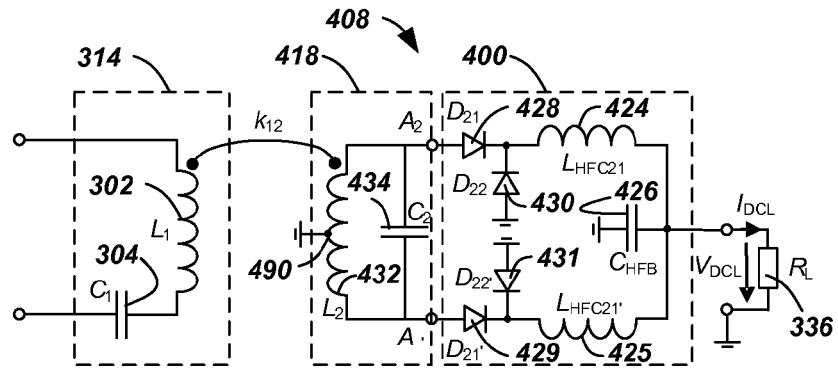
FIG. 11 illustrates a circuit diagram of yet another rectifier circuit variant of a wireless power receiver, in accordance with an exemplary embodiment.
Figure 12:
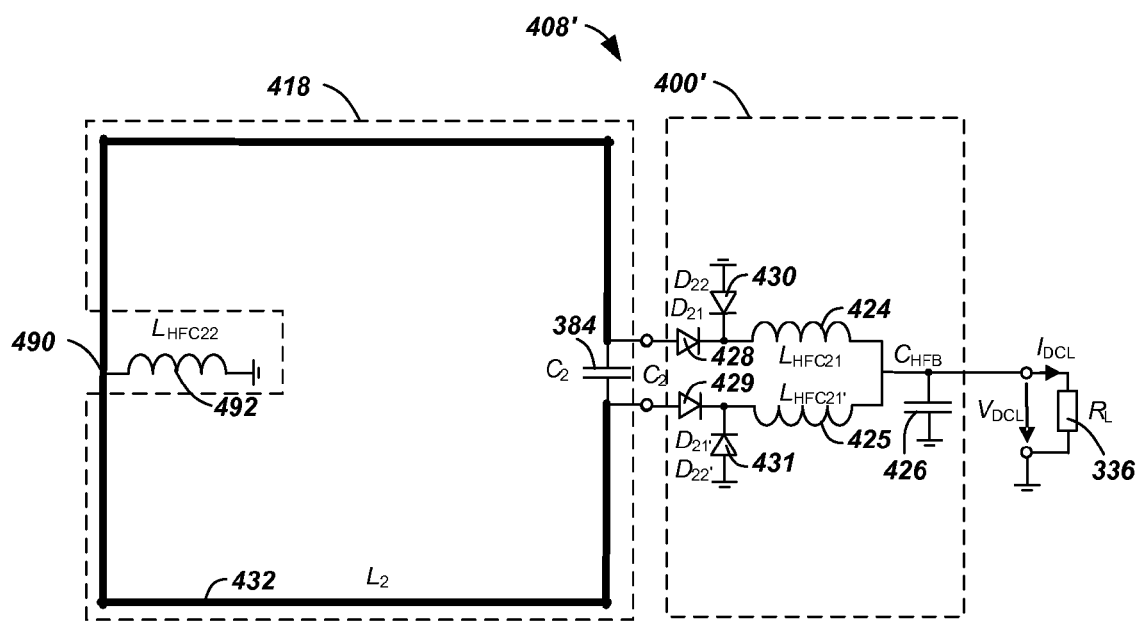
FIG. 12 a layout realization of the antenna part of the receiver variant of FIG. 11, in accordance with an exemplary embodiment.

FIG. 11 illustrates a circuit diagram of variant C of a wireless power receiver 408 including a receive antenna 418, including inductive loop $L_2$ 432 and capacitor $C_2$ 434, based on a passive quad diode full wave rectifier circuit 400, in accordance with an exemplary embodiment. Rectifier circuit 400 is implemented as to further increase the input of rectifier 400 as seen by receive antenna 418. Rectifier circuit 400 increases the input impedance by splitting load current $I_{DCL}$ into two equal portions. Rectifier circuit 400 includes diode $D_{21}$ 428, diode $D_{21'}$ 429, diode $D_{22}$ 430 and diode $D_{22'}$ 431. Rectifier circuit 400 further includes a symmetrical pair of HF chokes, ($L_{HFC21}$) 424 and ($L_{HFC21'}$) 425, and a high frequency (HF) block capacitor $C_{HFB}$ 426. Rectifier circuit 400 is implemented by DC tapping of the inductive loop $L_2$ 432 at point 490 to close the DC loop through diode $D_{21}$ 428, diode $D_{21'}$ 429, diode $D_{22}$ 430 and diode $D_{22'}$ 431. This tap at point 490 may be grounded as shown in FIG. 11. HF chokes 424 and 425 act as current sinks and with the transformation factor M is 0.25. Furthermore, the input impedance as seen at terminals $A_2, A_{2'}$ at a fundamental frequency is approximately 16 times the load resistance $R_L$. Accordingly, circuit matches to resonant antennas with higher L-C ratios where it is practical, or it may be used to match a low L-C ratio antenna to even lower load resistances if required FIG. 12 illustrates a low L/C realization of variant C of receiver 408 configured, for example, for a 13.56 MHz exemplary embodiment using a single turn loop receive antenna 418. According to the FIG. 11 realization of variant C of receiver 408, inductive loop $L_2$ 432 of receive antenna 418 may be implemented using a single turn loop receive antenna 408 in view of the low charging impedance $R_L$ of the load 336. As stated above with regard to FIG. 11, rectifier circuit 400 may be implemented by DC tapping of the inductive loop $L_2$ 432 at point 490. However, if an HF choke ($L_{HFC22}$) 492 is connected at a symmetry point 490 of the inductive loop $L_2$ 432, then minimum Q-factor degradation or detuning occurs from a non-ideal HF choke ($L_{HFC22}$) 492 even in presence of an asymmetric mode. Furthermore, since HF chokes 424, 425 (combined) and 492, carry the same DC current, it may be possible to omit the HF choke 492 and instead to ground the inductive loop at symmetry point where there is zero voltage potential.

Figure 13:
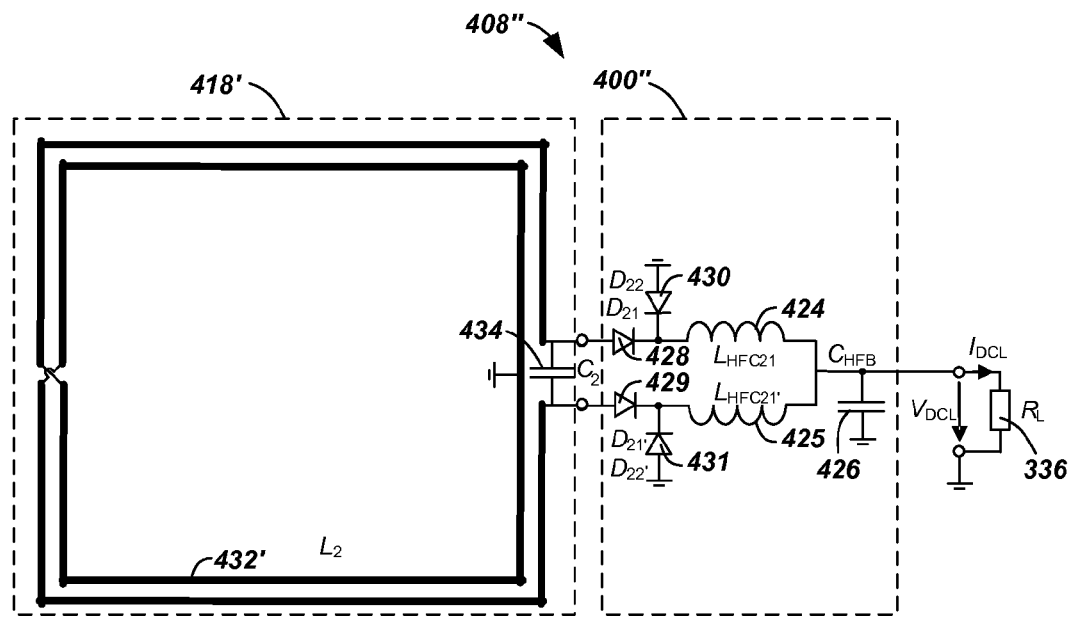
FIG. 13 yet another layout realization of the antenna part of the receiver variant of FIG. 11, in accordance with an exemplary embodiment.

FIG. 13 illustrates another low L/C realization of variant C of receiver 408' configured, for example, for a 13.56 MHz exemplary embodiment using a double turn loop receive antenna 418'. According to the FIG. 13 realization of variant C of receiver 408, inductive loop $L_2$ 432' of receive antenna 418 may be implemented using a double-turn loop receive antenna 418' in view of the low charging impedance $R_L$ of the load 336. The realization variant of FIG. 13 is implemented using a double HF chokes 424 and 425 and the inductive loop grounded at symmetry point where there is zero voltage potential.

Figure 14:
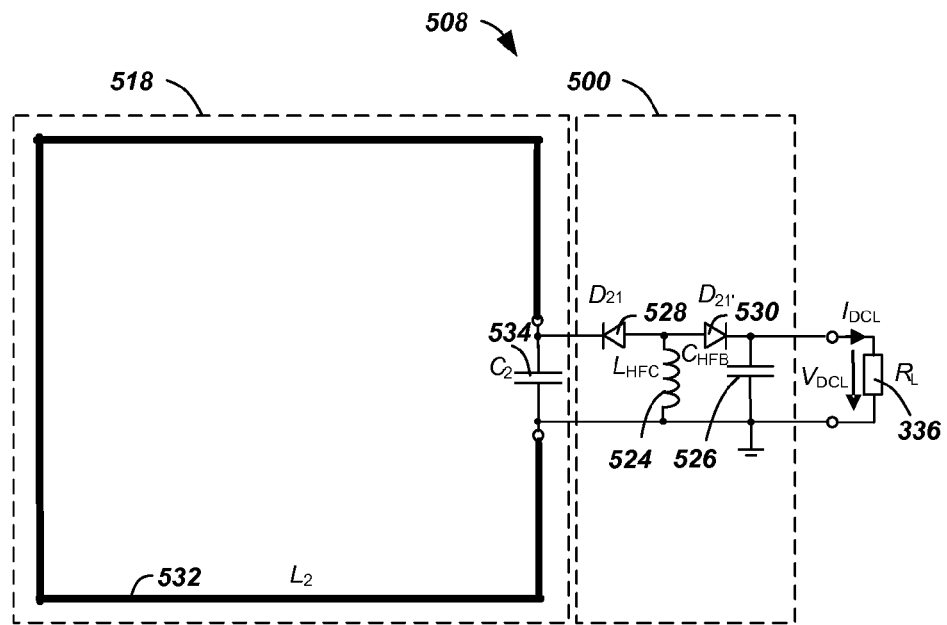
FIG. 14 illustrates a layout realization of the antenna part of receiver using a rectifier circuit with a one-to-one impedance transformation ratio for integration into mini-devices, in accordance with an exemplary embodiment.

FIG. 14 illustrates another low L/C realization of a receiver 508 with a rectifier 500 providing a one-to-one transformation ratio. This circuit configured, for example, for a 13.56 MHz exemplary embodiment using a single turn loop receive antenna 518 may be suitable for integration into smaller devices where charging resistance is typically higher, in accordance with an exemplary embodiment. In the present exemplary embodiment, wireless charging of miniature sized devices such as MP3 players and audio headsets are described herein. Receiver 508 is configured for proximity charging (e.g. on a Single Device Charging Pad (SDCP) dimensioned for mobile phones). By way of example, a coupling factor between a transmit antenna (not shown in FIG. 15) and a receive antenna 518, including inductive loop $L_2$ 532 and capacitor $C_2$ 534, may typically be in the order of 10% or lower, which may generally be considered as a moderately coupled (e.g., vicinity) regime. By way of example, some "mini-devices," such as audio headsets, use 3.7 V Li-Polymer rechargeable batteries and are charged at currents in the range from 0.1 to 0.2 A. At maximum charging current, the battery may present a load resistance of between 20 and 40 ohm.

A simplified receive antenna implementation uses a single turn wire loop suitably formed, for example, of silver-plated copper wire or copper ribbon (e.g. wound along the inner perimeter of the devices shell). The loop size may typically be in the order of 30 mm×15 mm or smaller but is desirably as large as practical. Resonance at HF (e.g. at 13.56 MHz) is achieved by means of a chip capacitor or a combination of chip capacitors with low Equivalent Series Resistance (ESR) (high Q-factor) providing a total capacitance (e.g. in the range from 2-3 nF) and may, for example, be NP0 or Mica capacitors. Actual measurements on a headset integrated resonant single turn loops have shown that unloaded Q-factors above 80 can be achieved at 13.56 MHz.

As stated, a desirable receiver topology includes a parallel resonant receive antenna 518 and a rectifier circuit 500 that presents an optimum equivalent load resistance when connected in parallel to the capacitor $C_2$ 534 of the resonant inductive loop $L_2$ 532. Rectifier circuit 500 includes diode $D_{21}$ 528 and diode $D_{21'}$ 530. Rectifier circuit 500 further includes a high frequency (HF) choke $L_{HFC}$ 524 and a high frequency (HF) block capacitor $C_{HFB}$ 526. Optimum antenna loading may be in the range from 40 to 100 ohms depending on actual size of the inductive loop $L_2$ 532 and coupling factor (i.e., mutual inductance).

If impedance $R_L$ of the load (e.g., battery) 336 is relatively low, a step-down rectifier circuit, for example, of FIG. 10 which approximately performs a 2:1 voltage transformation (4:1 impedance) may be a suitable choice. For higher resistance impedance $R_L$, the 1:1 transforming exemplary embodiment of FIG. 15 may provide an improved performance.

By way of example, if an optimum parallel load resistance is higher than 100 ohms, the resonant loop receive antenna 518 may be inductively coupled by means of a second non-resonant wire loop structure (not shown) (i.e., a so-called coupling loop). This approach may be advantageous with respect to integration into the headset as there are no more galvanic connections between rectifier circuit and the receive antenna. Accordingly, the coupling loop $L_2$ 532 and rectifier circuit may be integrated on the printed circuit board while the resonant inductive loop $L_2$ 532 could be an integral part of the headset shell.

By way of implementation in mini-devices incorporating an RF module such as Bluetooth headsets, it may theoretically be possible to combine the RF antenna (e.g. 2.4 GHz) with the 13.56 MHz resonant inductive loop $L_2$ 532 according to a special design also taking into account the high HF currents that may occur during wireless power transmission (i.e., charging).

Figure 15A:
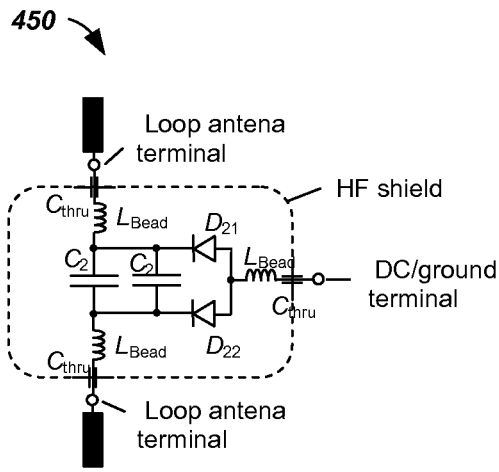
FIG. 15A illustrates a layout of an implementation of a rectifier circuit configured to block harmonics at the terminals of the rectifier circuit, in accordance with an exemplary embodiment.
Figure 15B:
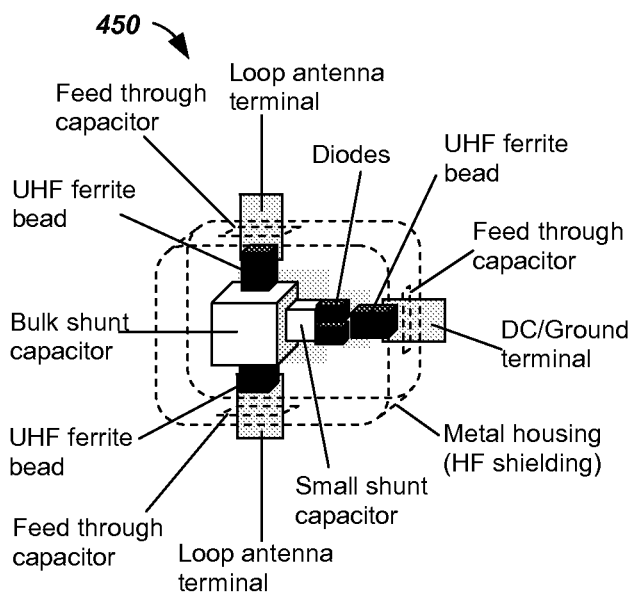
FIG. 15B illustrates a perspective view of packaged rectifier circuit configured with shielding to provide suppression of harmonics, in accordance with an exemplary embodiment.

FIG. 15A and FIG. 15B illustrate various practical implementation techniques, in accordance with the various exemplary embodiments described herein. According to the various exemplary embodiments described herein, wireless power transmission receive antennas use capacitively loaded ($C_2$) wire loops or multi-turn coils ($L_2$) forming a resonant structure that is capable of efficiently coupling energy from a transmit antenna 314 to a receive antenna 318, 368, 418 via a magnetic field if both the transmit antenna and the receive antenna are tuned to a common resonance frequency.

By way of example and not limitation, the variant B of rectifier circuit, rectifier circuit 350 of FIG. 7, and more specifically the realization of FIG. 10 is referred to with reference to FIG. 15A and FIG. 15B to describe an implementation and layout of passive low dV/dt diode rectifier circuits as described herein with reference to the various exemplary embodiments. The passive low dV/dt diode rectifier circuits exhibit a near rectangular current waveform, therefore, sometimes referred to square wave rectifiers.

FIG. 15A illustrates a layout of an implementation of a rectifier circuit 450 configured to block harmonics at the terminals of the rectifier circuit, in accordance with an exemplary embodiment. By way of implementation, ringing and harmonics generated by hard current switching and also by the forward recovery effect of diodes are practical issues of square wave rectifiers at high frequency. These ringing effects caused by excitation of parasitic resonance at harmonic frequencies can be observed on diode voltage and current waveforms.

With reference to FIG. 10, parasitic reactive elements in the circuit formed by capacitor $C_2$ 384, diode $D_{21}$ 378 and diode $D_{21'}$ 380 form a series resonant circuit with relatively high Q and typically high resonance frequency. The HF equivalent circuit consists of several parasitic inductances and the junction capacitances of the diodes. The diode that is reversed biased mainly determines the effective series capacitance. The lower the diode capacitance (in reversed bias mode) and the parasitic inductances are, the higher the ringing frequency. Fast low capacitance Shottky diodes (e.g. 1 A current class) typically show ringing at frequencies far in the UHF (several hundred Megahertz) also depending on the circuit layout and the characteristics of the shunt capacitor $C_2$ 384. As long as voltage ringing does not force the diode to commute between forward and reverse bias, ringing has no detrimental effect on the efficiency of rectifier circuits. Nevertheless, some oscillatory energy is absorbed in diodes and HF chokes.

By way of example, ringing amplitude and frequency can be controlled by circuit layout and the placement of components $C_2$, $D_{21'}$, $D_{21}$. By way of implementation, low inductance layouts and selection of low inductance capacitor may provide improved implementation results. By way of example, at HF (e.g., 13.56 MHz), capacitor $C_2$ 384 may typically be in the nanofarad range and exhibit significant self-inductance.

A low inductance circuit can be achieved with a minimum size layout where components are tightly packed and realizing capacitor $C_2$ by, for example, two parallel chip capacitors, (e.g. a bulk capacitor in the nanofarad range and another smaller one in the 100 pF range) exhibiting very low inductance. A further implementation solution may also be achieved by building a hybrid circuit where unpackaged diodes are mounted together with a micro chip capacitor on a common substrate providing a circuit with minimum parasitic inductance. The use of broadband HF chokes that perform reasonably well at UHF may also help to increase the efficiency of rectifier circuits.

Another issue relating to implementation involves unwanted harmonics which may cause interference in sensitive RF functions (e.g., in case of a mobile phone), which is particularly true for rectifier circuits operating at high frequency. Diode parasitic resonance may additionally amplify harmonic content around resonance frequency. To prevent harmonics from propagating into the device RF circuitry and from causing interference, all rectifier circuit terminals, including loop antenna and DC/ground connections, should be adequately filtered.

FIG. 15B illustrates a perspective view of packaged rectifier circuit 450 configured with shielding to provide suppression of harmonics, in accordance with an exemplary embodiment. Additional shielding of the circuit may render this filtering more effective. A suitable approach to block harmonics content at circuit terminals may use HF shielding, UHF ferrite beads, and feed-through capacitors, for example, in the picofarad range. To block harmonics at loop antenna terminals, the filter components should be dimensioned such that performance of the loop antenna is not noticeably degraded, meaning the additionally used components are transparent at the fundamental operating frequency.

Various exemplary embodiments have been described for strongly coupled (i.e., proximity) transmitter to receiver configurations. Techniques disclosed herein are optimized for highly efficient wireless charging of electronic devices (e.g. mobile phones) in a strongly coupled (i.e., proximity) regime where transmitter and receiver are in close proximity (coupling factors typically above 10%). The disclosed exemplary embodiments have been described which avoid DC-to-DC converters in the receiver as a means for impedance transformation and have instead disclosed various exemplary embodiments utilizing rectifier circuits resulting in a reduction in complexity and component count.

Suitable rectifier circuits in the receiver have been disclosed which (1) smooth voltage changes (low dV/dt) to reduce losses due to charging/discharging of diode capacitance, (2) minimized voltage drop losses by having only one diode conducting at a time to reduce losses due to forward bias voltage drop, and (3) impedance transformation of low load resistances (e.g., battery charging resistance e.g. 4V/0.8 A=5 Ohm) into a significantly higher resistance (e.g. 4 times higher). In a weaker (e.g., vicinity) coupled system where the transmitter and receiver, for example, are misaligned, the coupling factor decreases since the charging current dropped causing the load impedance $R_L$ to increase. Increased load impedance in turn will increase transfer efficiency in weaker coupling conditions, assuming a parallel resonant circuit. Such an outcome is termed 'inherent load adaptation'.

By way of example and referring back to FIG. 10, receiver 358 provides an exemplary receiver fulfilling the above requirements. Receiver 358 includes a parallel resonant receive antenna 368 comprised of a low inductance magnetic loop antenna (e.g. single turn) inductor $L_2$ 382 and a capacitor $C_2$ 384 (antireactor) that brings receive antenna 368 on resonance at a desired frequency, and a rectifier circuit 350' that imposes a shunt load to the capacitor $C_2$ 384 so that diode junction capacitances in rectifier circuit 350' can be considered merged into anti-reactor resulting in lower diode switching losses.

Moreover, receiver 358, for example, tends to maintain high efficiency when the coupling factor is decreasing due to device misalignment when the charging current drops (inherent load adaptation) if the system does not attempt to compensate for a decrease in charging current by increasing the transmit power. A conservation or "green" approach to misalignment attempts to maintain high efficiency rather than a constant charging current. This policy however requires the proper placement of the device's receiver in a charging area (within some tolerances) if charging is to be performed at maximum speed.

As stated, a drop in charging current at the load (e.g., battery) leads to an increased charging (load) resistance or impedance $R_L$. Increased load resistance $R_L$ in turn exerts a positive effect on transfer efficiency since the parallel loaded Q increases, which is beneficial in weaker coupling conditions. This efficiency increase can be shown and quantified using circuit analysis.

By way of example, in series loaded resonance receive antenna (not shown), an increase in load resistance $R_L$ when coupling becomes weaker had a counterproductive effect. Therefore, the load resistance $R_L$ should be decreased if maximum link efficiency is targeted. In weak coupling conditions (e.g. coupling factor around 10%) a parallel resonant receive antenna appeared more suitable, by up to 10% in link efficiency, to a series resonant receive antenna. Accordingly, a series resonant receive antenna is considered less suitable for close proximity coupling systems.

By way of implementation, desired or optimum parameters for the receive antenna, including inductive loop $L_2$ 382 and a capacitor $C_2$ 384 are determined to maximize the wireless power transmission efficiency in the presence of given load impedance $R_L$. The load impedance $R_L$ may be transformed using a selected rectifier circuit according to the various transmission conditions and circuits described herein as well as any coupling factor variations due to misalignment between the transmitter and receiver.

Generally, a single turn rectangular loop of the approximate size of the device's perimeter provides suitable inductance when integrated into the device. A single turn loop is the simplest antenna structure and likely with lowest manufacturing costs. Various realizations are possible e.g. copper wire, copper ribbon (cut out from copper sheet), PCB, etc. A receiver according to various exemplary embodiments includes a parallel resonant receive antenna with the various diodes of the rectifier circuit substantially in parallel to the capacitance (anti-reactor) of the receive antenna so that diode junction capacitance can be considered merged into anti-reactor capacitance.

As stated, the receiver according to the various exemplary embodiments described herein also tends to maintain high efficiency when the transmitter-to-receiver coupling factor is decreased due, for example, misalignment which causes the load (e.g., battery) impedance $R_L$ to increase. An increased load (e.g., battery) impedance $R_L$ exerts a positive effect since the parallel loaded-Q increases which maintains high efficiency in weak coupling conditions. As stated, this effect may be described as "inherent load adaptation."

If battery management opens charging switch (totally unloaded case), there is detuning effect of parallel tank circuit which reduces open-circuit voltage relaxing requirements to rectifier diodes and circuit over-voltage protection (zener diode) needed to protect battery charging input and to stay in the voltage window accepted by the device charge controller. This inherent detuning effect is another advantage of using a parallel resonant antenna circuit.

Figure 16:
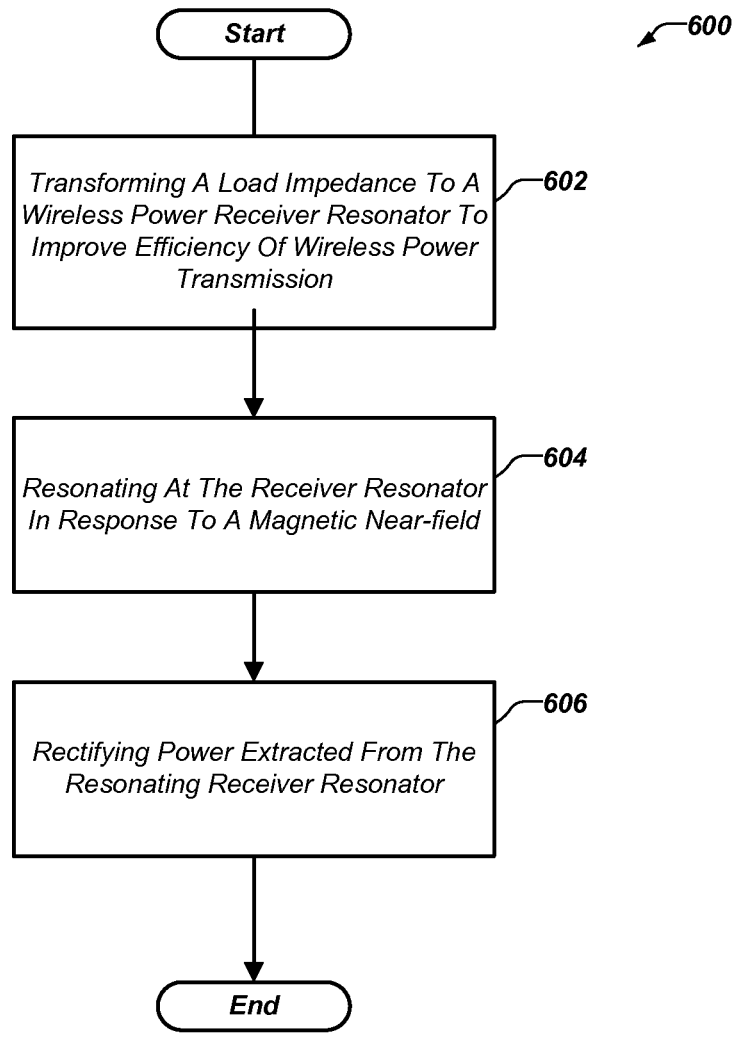
FIG. 16 illustrates a flowchart of a method for receiving wireless power, in accordance with an exemplary embodiment.

FIG. 16 illustrates a flowchart of a method for receiving wireless power, in accordance with an exemplary embodiment. Method 600 for receiving wireless power is supported by the various structures and circuits described herein. Method 600 includes a step 602 for transforming a load impedance to a wireless power receiver resonator to improve efficiency of wireless power transmission. Method 600 further includes a step 604 for resonating at the receiver resonator in response to a magnetic near-field. Method 600 yet further includes a step 606 for rectifying power extracted from the resonating receiver resonator.

Those of skill in the art would understand that control information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, and controlled by computer software, or combinations of both. To clearly illustrate this interchangeability of hardware and software, various illustrative components, blocks, modules, circuits, and steps have been described above generally in terms of their functionality. Whether such functionality is implemented and controlled as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmission receiver, comprising:
a power transfer component including a resonator configured to receive power from an electromagnetic field at a power level sufficient to charge a load, the resonator having an output; and
a rectifier circuit coupled between the output of the resonator and the load, the rectifier circuit configured to modify an impedance at the load.

2. The receiver of claim 1, wherein the rectifier circuit is configured as a dual-diode full-wave rectifier circuit.

3. The receiver of claim 2, wherein the rectifier circuit is configured to modify the impedance by stepping-down the impedance by approximately 4-to-1.

4. The receiver of claim 2, wherein the resonator includes an inductive loop and the inductive loop is coupled to ground at one of its loop terminals.

5. The receiver of claim 2, wherein the resonator includes an inductive loop and the inductive loop is coupled to ground using a high frequency choke.

6. The receiver of claim 2, wherein the resonator includes an inductive loop and the inductive loop is coupled to ground.

7. The receiver of claim 2, wherein the rectifier circuit includes a high frequency choke and the resonator includes an inductive loop, the high frequency choke coupled between the inductive loop and ground.

8. The receiver of claim 2, wherein the rectifier circuit includes at least one diode and the resonator includes an inductive loop, the at least one diode coupled between the inductive loop and ground.

9. The receiver of claim 2, wherein the rectifier circuit includes first and second diodes and the resonator includes an inductive loop, the first and second diodes coupled between the inductive loop and ground, the rectifier circuit further including first and second high frequency chokes respectively coupled in series with the first and second diodes.

10. The receiver of claim 1, wherein the rectifier circuit is configured as a symmetric quad-diode full-wave rectifier circuit with the inductive loop coupled to ground at its symmetry point.

11. The receiver of claim 10, wherein the rectifier circuit is configured to modify the impedance by stepping-down the impedance by approximately 16-to-1.

12. The receiver of claim 10, wherein the resonator includes an inductive loop and the inductive loop is coupled to ground using a high frequency choke.

13. The receiver of claim 10, wherein the rectifier circuit includes a high frequency choke and the resonator includes a loop inductor, the high frequency choke coupled between the loop inductor and ground.

14. The receiver of claim 10, wherein the resonator includes a double-turn inductive loop and the double-turn inductive loop is coupled to ground at its symmetry point.

15. The receiver of claim 1, wherein the rectifier circuit is configured to modify the lead impedance by approximately 1 to 1.

16. The receiver of claim 1, wherein the resonator includes a capacitor and the rectifier circuit includes at least first and second diodes coupled in parallel to the capacitor.

17. The receiver of claim 1, wherein the power transfer component is configured to receive power from an electromagnetic near-field region of a transmitter.

18. The receiver of claim 1, wherein the rectifier circuit includes a plurality of inputs, and wherein the receiver further comprises a plurality of filters for each of the plurality of inputs.

19. The receiver of claim 1, wherein the rectifier circuit includes a shield configured to suppress harmonic signals generated by the rectifier.

20. The receiver of claim 19, wherein the shield includes at least one of a high frequency (HF) shield, an ultra high frequency (UHF) ferrite bead, or a feed through capacitor.

21. The receiver of claim 1, wherein the rectifier circuit includes a first capacitor and a second capacitor connected in parallel to the first capacitor, and wherein the rectifier circuit further includes a first diode and a second diode connected in series to the first capacitor and the second capacitor.

22. The receiver of claim 1, wherein the power transfer component is a coil.

23. The receiver of claim 1, wherein the power transfer component is an antenna.

24. The receiver of claim 1, wherein the impedance at the load is based on a collective impedance of the rectifier circuit and the load.

25. An electronic device, including a wireless power receiver, the wireless power receiver comprising:
a power transfer component including a resonator configured to receive power from an electromagnetic field at a power level sufficient to charge a load, the resonator having an output; and
a rectifier circuit coupled between the output of the resonator and the load, the rectifier circuit configured to modify an impedance at the load.

26. The device of claim 25, wherein the power transfer component is configured to receive power from an electromagnetic near-field region of a transmitter.

27. The device of claim 25, wherein the rectifier circuit includes a plurality of inputs, and wherein the receiver further comprises a plurality of filters for each of the plurality of inputs.

28. The device of claim 25, wherein the rectifier circuit includes a shield configured to suppress harmonic signals generated by the rectifier circuit.

29. The device of claim 28, wherein the shield includes at least one of a high frequency (HF) shield, an ultra high frequency (UHF) ferrite bead, or a feed through capacitor.

30. The device of claim 25, wherein the rectifier circuit includes a first capacitor and a second capacitor connected in parallel to the first capacitor, and wherein the rectifier circuit further includes a first diode and a second diode connected in series to the first capacitor and the second capacitor.

31. The device of claim 25, wherein the power transfer component is a coil.

32. The device of claim 25, wherein the power transfer component is an antenna.

33. The device of claim 25, wherein the impedance at the load is based on a collective impedance of the rectifier circuit and the load.

34. A method for receiving power via an electromagnetic field, the method comprising:
receiving, by a resonator, power from the electromagnetic field at a power level sufficient to charge a load, the resonator having an output;
modifying an impedance at the load; and
rectifying, by a rectifier circuit coupled between the output of the resonator and the load, power received by the resonator.

35. The method of claim 34, wherein modifying an impedance and rectifying power is performed by the same rectifying circuit.

36. The method of claim 34, wherein rectifying power includes receiving current with the rectifier circuit configured as a dual-diode full-wave rectifier circuit.

37. The method of claim 34, wherein rectifying power includes receiving current with the rectifier circuit configured as a symmetric quad-diode full-wave rectifier circuit.

38. The method of claim 34, wherein receiving comprising resonating in an electromagnetic near-field region of a transmitter.

39. The method of claim 34, further comprising suppressing harmonic signals generated by rectifying the power extracted from the resonator.

40. The method of claim 34, wherein modifying the impedance at the load comprises modifying a collective impedance of the rectifier circuit and the load.

41. A wireless power receiver, comprising:
means for receiving power from an electromagnetic field at a power level sufficient to charge a load, the means for receiving power having an output;
means for modifying an impedance at the load; and
means for rectifying power received by the means for receiving power, the means for rectifying coupled between the output of the means for receiving power and the load.

42. The receiver of claim 41, wherein the means for receiving power comprises a power transfer component including a wireless power receiver resonator, and wherein the means for modifying the lead impedance and the means for rectifying power comprise a rectifying circuit.

43. The receiver of claim 42, wherein the receive power transfer component is configured to receive power from an electromagnetic near-field region of a transmitter.

44. The receiver of claim 43, wherein the power transfer component is a coil.

45. The receiver of claim 43, wherein the power transfer component is an antenna.

46. The receiver of claim 41, wherein the means for modifying the impedance at the load comprises means for modifying a collective impedance of the means for rectifying and the load.

* * * * *